(12) United States Patent
Shepherd

(10) Patent No.: US 6,840,802 B2
(45) Date of Patent: Jan. 11, 2005

(54) COMBINED CONTROL/CONNECTOR FOR CORDLESS ELECTRICAL APPLIANCES

(75) Inventor: Martin J. Shepherd, Causeway Bay (HK)

(73) Assignee: Kettle Solutions Limited (HK)

( * ) Notice: Subject to any disclaimer, the term of this patent is extended or adjusted under 35 U.S.C. 154(b) by 248 days.

(21) Appl. No.: 10/166,552

(22) Filed: Jun. 10, 2002

(65) Prior Publication Data

US 2002/0193003 A1 Dec. 19, 2002

(30) Foreign Application Priority Data

Jun. 11, 2001 (GB) .............................................. 0114145

(51) Int. Cl.$^7$ ........................ H01R 13/60; H01R 13/66
(52) U.S. Cl. ...................... 439/568; 219/432; 439/929
(58) Field of Search ................................ 439/568, 924.1, 439/929; 219/432, 433, 435, 429; 392/444

(56) References Cited

U.S. PATENT DOCUMENTS

| | | | |
|---|---|---|---|
| 3,825,882 A | | 7/1974 | Tucker ........................ 339/103 |
| 4,519,666 A | | 5/1985 | Williams et al. ............. 339/177 |
| 4,621,186 A | * | 11/1986 | Taylor et al. ................ 219/437 |
| 4,812,623 A | * | 3/1989 | Haden et al. ................ 219/437 |
| 4,982,654 A | * | 1/1991 | Bourgeois .................. 99/323.3 |
| 5,176,528 A | * | 1/1993 | Fry et al. ..................... 439/181 |
| 5,413,510 A | * | 5/1995 | Taylor ......................... 439/886 |
| 5,866,878 A | * | 2/1999 | Lacombe ..................... 219/441 |
| 5,957,723 A | * | 9/1999 | Gort-Barten ................. 439/568 |
| 5,971,810 A | * | 10/1999 | Taylor ......................... 439/675 |
| 6,095,821 A | * | 8/2000 | Panella et al. ................. 439/60 |
| 6,178,290 B1 | * | 1/2001 | Weyrauch et al. ........... 392/445 |
| 6,447,340 B1 | * | 9/2002 | Wu ............................. 439/660 |

FOREIGN PATENT DOCUMENTS

| | | | | |
|---|---|---|---|---|
| DE | 37 39 318 A1 | | 6/1989 | ............ H05B/3/68 |
| DE | 198 30 181 C1 | | 9/1999 | ............ H01R/35/00 |
| EP | 0 490 762 A1 | | 12/1991 | ............ A47J/27/21 |
| FR | 0490762 | * | 12/1991 | ............ A47J/27/21 |
| FR | 2795857 | * | 7/1999 | ............ H01H/3/16 |
| FR | 2795875 | * | 10/1999 | ......... H01R/13/703 |
| GB | 2 170 662 A | | 1/1986 | ......... H01R/13/703 |
| GB | 2 204 218 A | | 4/1987 | ......... H05B/3/8253 |
| GB | 2 209 633 A | | 9/1987 | ......... H01R/13/453 |
| GB | 2 218 867 A | | 5/1988 | ......... H01R/13/703 |
| GB | 2 221 104 A | | 5/1988 | ......... H01R/13/631 |
| GB | 2 222 025 A | | 8/1988 | ............ A47J/27/21 |
| GB | 2 241 390 A | | 1/1991 | ............ H01R/13/00 |
| GB | 2 263 364 A | | 9/1991 | ............ H01R/13/03 |
| GB | 2361815 | * | 10/2001 | ......... H01R/13/502 |
| WO | WO99/48333 | | 9/1999 | ............ H05B/3/82 |

* cited by examiner

Primary Examiner—Hae Moon Hyeon
(74) Attorney, Agent, or Firm—Baker Botts L.L.P.

(57) ABSTRACT

A combined control unit/connector for a cordless electrical water heating appliance for connection in use to a heating element thereof is disclosed, comprising a housing, thermally sensitive control unit for switching of said heating element and a protrusion extending vertically from directly beneath the housing on which are disposed electrical contacts for making connection to a separate base.

29 Claims, 6 Drawing Sheets

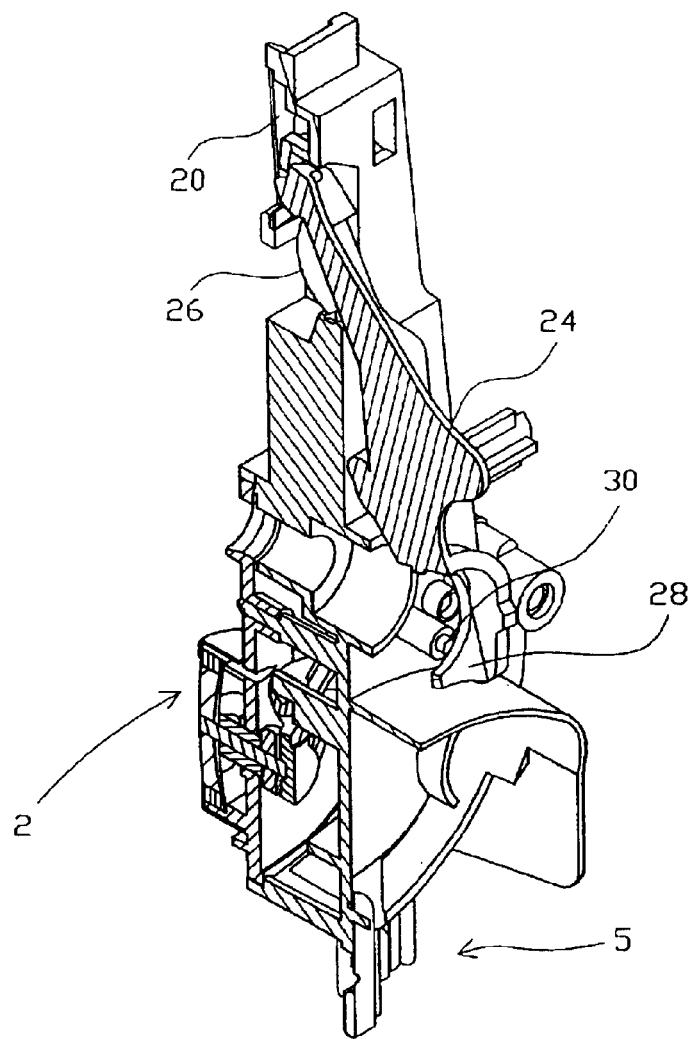
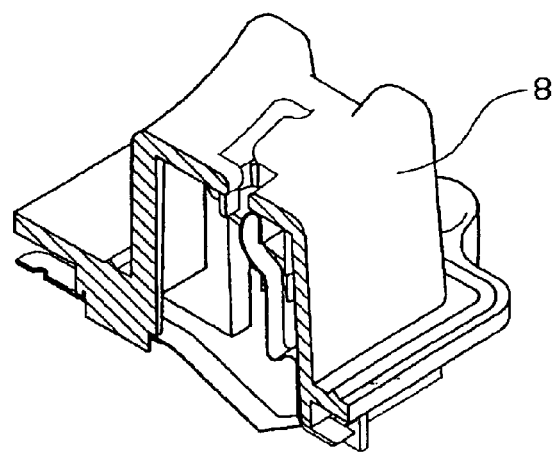
Fig.2

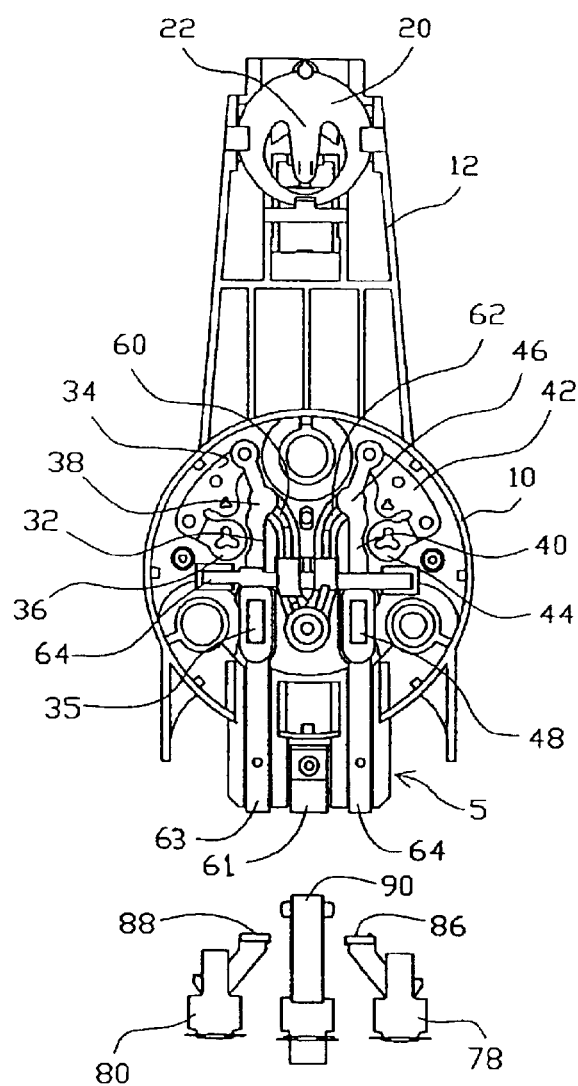
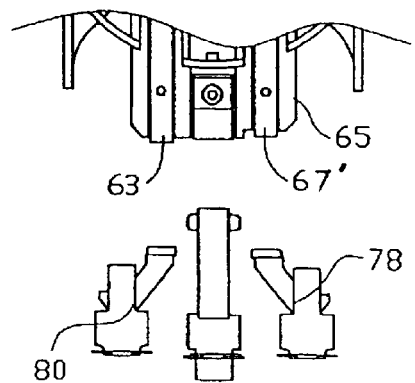
Fig.6
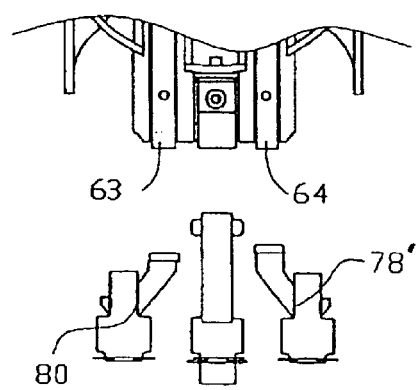
Fig.7

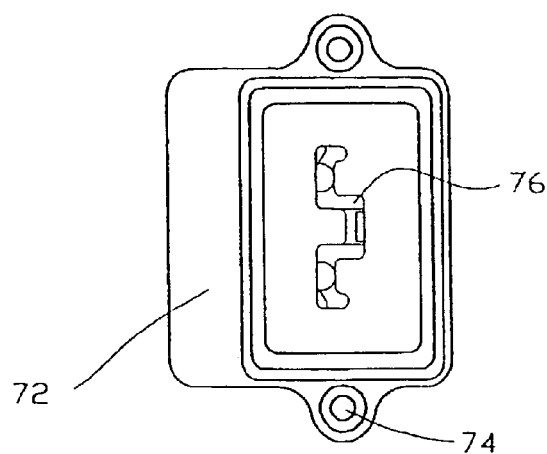
Fig.12
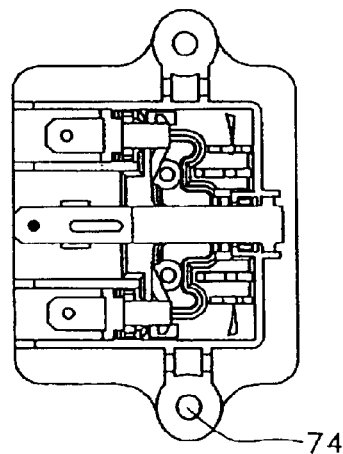
Fig.11
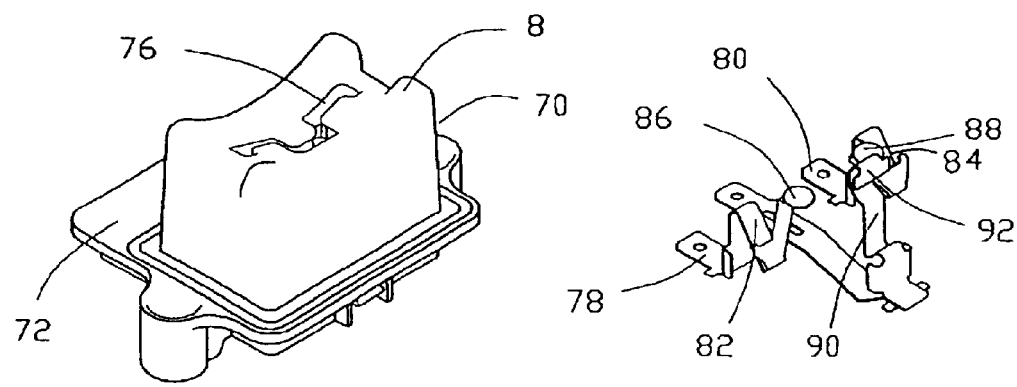
Fig.10(a)                    (b)

COMBINED CONTROL/CONNECTOR FOR CORDLESS ELECTRICAL APPLIANCES

BACKGROUND OF THE INVENTION

The present invention relates to a combined control/connector for cordless electrical water heating appliances such as hot water jugs and kettles.

Such appliances are provided with a base or stand upon which the appliance may be placed for the supply of electrical power to the appliance. The base is normally provided with a female socket connector which is connected to the mains electrical supply and with which a male pin connector of the appliance engages when the appliance is placed on the base to supply power to the appliance.

It is also normal to provide such cordless water heating appliances with a thermally sensitive control including a set of switch contacts which open in the event that for example, liquid within the vessel boils, or the electric heater element of the appliance overheats should the appliance boil dry or be switched on without water, to interrupt the electrical supply to the heater element. Such controls are often self-contained units which are mounted onto the appliance and which, for maximum manufacturing flexibility may be used in either corded or cordless appliances. An example of such a control is shown in applicant's co-pending GB Application No. 0109777.3.

The present invention is a development of this control the contents of the GB Application No. 0109777.3 being incorporated herein by reference.

In cordless appliances the male pin connector may be conveniently and commonly formed by a terminal pin connector of the thermally responsive control or by a terminal pin connector serving as an adapter, mounted on the male pin connector of a thermal control unit.

In each case the standard I.E.C. plug pin configuration of the horizontally-extending pins is placing constraints on the overall size and shape of connectors, resulting in a connector of unnecessarily large dimension and cost.

For example, both GB 2241390 of Otter Controls Ltd and GB 2263364 of Strix Ltd shows three terminal pins which project rearwardly from the control unit which make engagement with spring contacts in the female connector part. In EP 0490762 of S.E.B. SA the three pins extending from the control unit are of a "L shape", the depending portions engaging the contacts in the female connector part. In GB 2209633 of Strix Ltd the terminal pins of the control unit extend rearwardly and by means of sleeves are connected to "L-shaped" pins. In GB 2221104 of Strix Ltd the horizontal terminal pins of the control unit are connected to vertical terminal pins through a sleeve-type arrangement.

SUMMARY OF THE INVENTION

The present invention seeks to provide a connector which overcomes these drawbacks.

Embodiments of the invention are now described by way of example only, with reference to the following drawings in which:

According to a first aspect of the invention there is provided a combined control unit/connector for a cordless electrical water heating appliance for connection in use to a heating element thereof, comprising a housing, thermally sensitive control means for switching of said heating element and a protrusion extending vertically from directly beneath said housing on which are disposed electrical contacts for making connection to a separate base.

This structure is thereby able to utilise the space directly below the control for making connection to the power-supplying base.

The protrusion is preferably unitarily formed with the housing, and comprises a tongue-like protrusion having a width greater than its thickness with the conductors disposed spaced across the width of the protrusion, and having a non-linear-shaped section.

More particularly, the protrusion may be shaped so that adjacent contacts are displaced relatively to each other in the direction of the thickness of the protrusion. For example, the shape may comprise a pair of channels facing in one direction with a channel therebetween facing in the opposite direction, the contacts being disposed at the base of each channel. This results in a shape which can be of very small thickness, whereby the corresponding slot in the female connector can be made very thin and therefore safe, whilst the protrusion is still rigid.

In the preferred embodiment the contacts comprise thin metal strips which extend from the control unit over a lower free end of the protrusion and back up an opposite face of the protrusion, which may be of thickness less than 0.5 mm and formed of copper or an alloy thereof. They may be formed unitarily with or directly connected to switching spring contacts with the control unit.

The contacts may comprise live, neutral and earth conductors wherein one of the live and neutral conductors is arranged to extend in a direction further from the control unit than the other. This ensures that if the kettle is put on the base or removed therefrom whilst being switched on there is sequential electrical connection or breaking of live and neutral connections. This minimises the rate of change of potential and hence the risk of sparking or arcing which can lead to damage of the control unit and connectors as well as being a safety hazard. Such has been found to be particularly important where the kettle has a heating element which comprises a long coil as the resulting high inductance can greatly increase the susceptibility to arcing.

The housing may be provided with water-shielding walls which depend from the housing spaced from the protrusion, which may extend down opposite sides of the protrusion or may totally surround it.

The thermally sensitive control means may include a steam sensing trip lever to switch off the appliance on boiling of water and sensing means adapted to switch off the appliance at an elevated temperature corresponding to a dry boil condition, i.e. dry boil protection.

In a further aspect the invention resides in a combined control unit/connector as defined above in combination with a female connector for fitting to a power-supplying base, the female connector having an opening for receiving the protrusion and electrical contacts which engage the electrical contacts of the control unit/connector on mating of the connectors.

In a still further aspect the invention resides in a cordless electrical kettle having a combined control unit/connector as defined above.

In a still further aspect the invention resides in a female connector for use in a power-supplying base of a cordless water-heating appliance comprising a housing defining a single continuous slot at an upper region thereof through which a male connector can be inserted and electrical contacts disposed beneath the slot.

Preferably, the slot has a non-linear shape. In one embodiment the slot has a shape comprising straight portions extending in the general direction of the extent of the slot where adjacent straight portions are laterally displaced with respect to each other, with the electrical contacts are disposed beneath said straight portions. The slot has a pair of substantially co-linear portions disposed above live and neutral contacts with the laterally displaced portion arranged therebetween above an earth contact.

The live and neutral contacts may be disposed in the housing beneath the slot with one of the live or neutral contacts disposed closer to the slot than the other. Thus, sequential live and neutral connection/disconnection can be arranged through the adaptation of the female connector.

The invention in further aspects also resides in a power-supplying base being a female connector as defined above; in a combined control unit/connector as defined above when combined with a female connector as defined above; and in an electrical kettle with control unit/connector as defined above in combination with a power supplying base as defined above.

BRIEF DESCRIPTION OF THE DRAWINGS

FIG. 2 is a vertical section through the control/connector and a female connector;

FIG. 5 is a front view of the control unit/connector with the cover removed, and also showing the contacts of the female connector;

FIG. 6 is a view of a second embodiment with alternative male connector;

FIG. 7 is a view of a third embodiment with an alternative form of female connector;

FIG. 10(a) is a perspective view of the female connector;

FIG. 10(b) is a view of the electrical contacts from the female connector;

FIG. 11 is a view of the female connector from below; and

FIG. 12 is a view of the female connector from above.

DESCRIPTION OF THE PREFERRED EMBODIMENT

Figure 1:
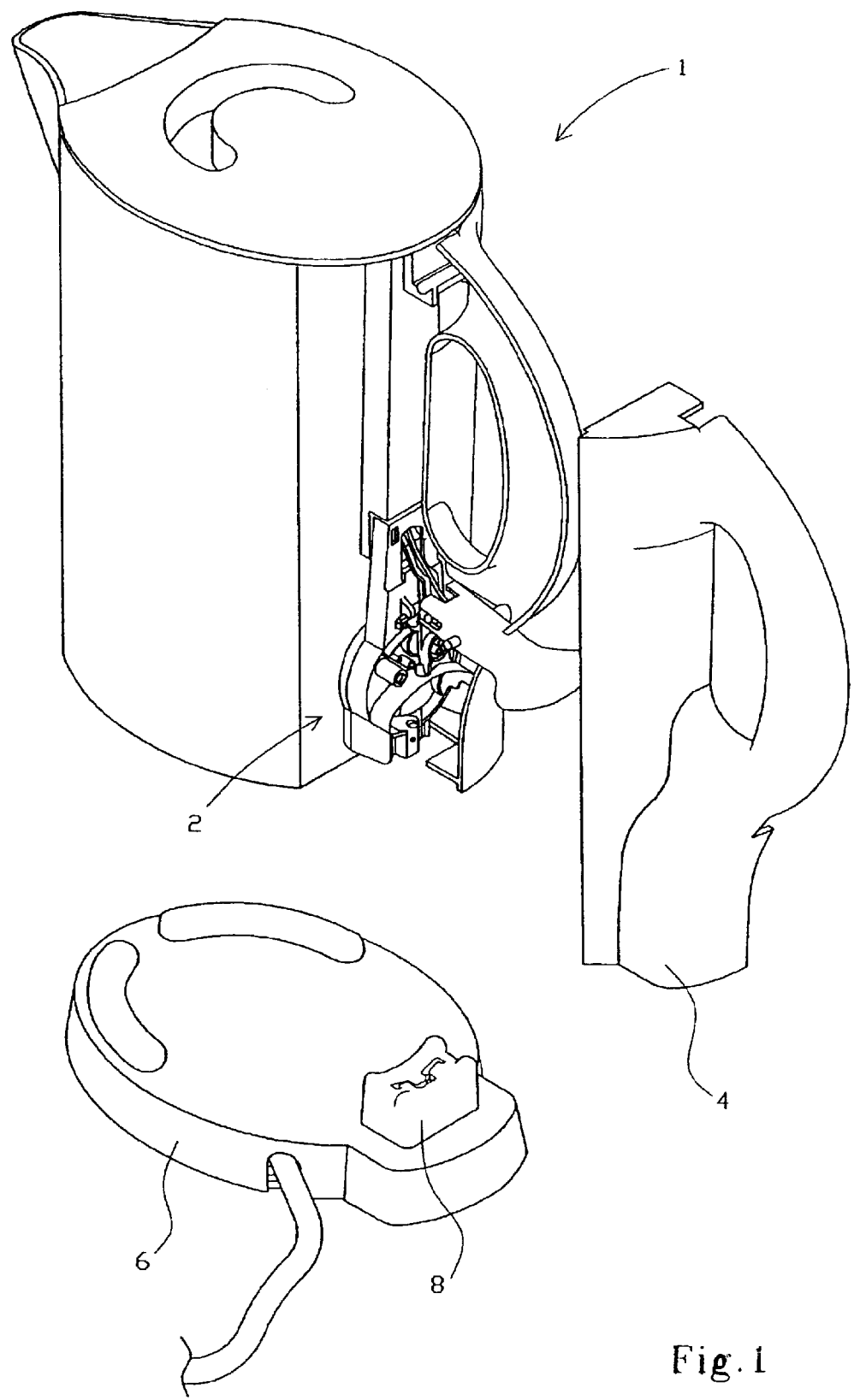
FIG. 1 shows a cordless kettle and base with an outer cover part for the combined control/connector partly removed.

Turning to the drawings and firstly in particular FIG. 1 this shows an appliance being a water heating kettle or jug generally indicated 1. On the rear of the kettle 1 is arranged a combined control unit and male connector 2 having a connecting portion 5 which is enclosed within a cover 4 formed by two housing parts which also form a handle for the kettle.

A separate base 6 is provided through which power is supplied. A power cord is connected to the base and in use connected to a mains power supply. A female connector 8 of the base mates with the male connector portion 5 to supply power to the kettle 1.

The control 2 is of a general type which is used in an electrical water heating appliance such as a kettle or jug, which includes an immersed heating element. As is conventional, when fitted such an element extends laterally into water carrying body of the kettle from a head plate which is fitted into an opening in the side wall near the base of a water carrying body of the kettle. Extending through the head plate are the cold tails of the heating element to which the control is electrically connected. The control 2 provides both the automatic switch-off of the kettle when water has reached the required temperature, typically at boiling, as well as providing overheat protection in the event of failure of automatic switch-off or in the event of operation of the kettle with no water inside, i.e. so-called "dry-boil" protection.

The control has a generally cylindrical cup-like hollow housing 10 formed of moulded plastics from which upstands a plate-like support 12. The housing 10 contains or supports the majority of the switching components and is closed at the frontwardly-facing opening (where the front indicates the direction facing the kettle main water carrying body) by a circular cover 14. Water shielding walls 15 are provided depending from the housing.

On the front of the cover 14 is arranged part of the switching means for providing the dry boil protection, namely, a number of bimetallic elements discussed as further below which are held beneath a metallic cap 16 having a circular opening through which the foremost bimetallic element 18 is visible. In use, the control is disposed so that the cap 16 lies adjacent or in close thermal contact with a hot spot on the heating element head, as is well-known in the art.

Disposed on the front of the control 2 at an upper region of the support 12 is a bimetallic switch element 20. In the assembled kettle the element 20 is disposed in a steam passageway in communication with the interior of the kettle, whereby steam passes over the element 20. The element 20 is of a well-known construction comprising a thin bimetallic disc which is slightly dished so as to be rearwardly concave when cold having a generally U-shaped opening cut therein defining a central tongue 22. At a predefined temperature the element snaps to an inverted position in which it is dished in the opposite direction. The element 20 is held at its periphery, whereby the central tongue 22 moves rearwardly with respect to the support 12 at the defined temperature.

Figure 3:
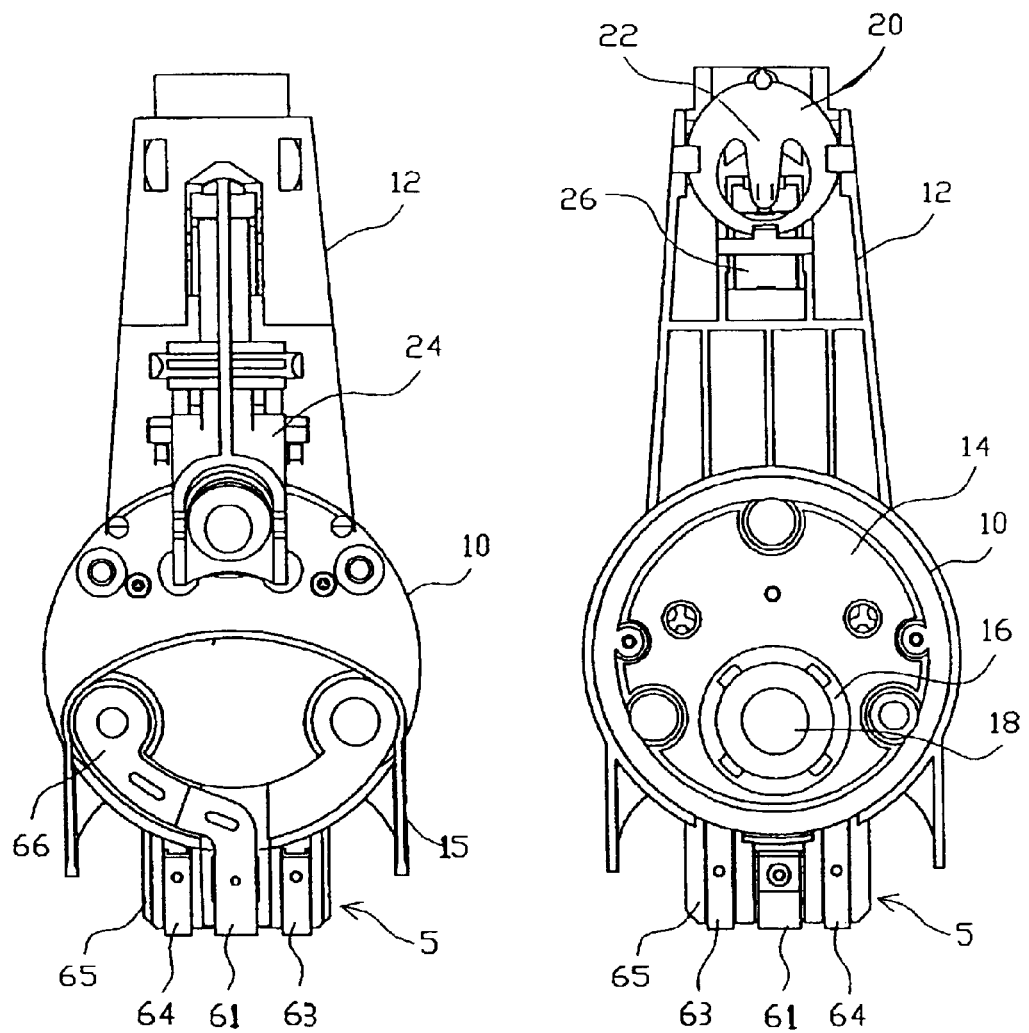
FIG. 3 is a rear view of the control unit/connector, and the female connector.

On the rear of the support 12 is a bi-stable lever 24 most clearly seen in FIGS. 2 and 3 arranged to pivot about an upwardly directed knife edge which engages in a shallow slot in rearwardly protruding fingers on the support 12, and more particularly, to snap between a first ("on") position where the upper end of the lever lies closest to the support 12 and a second ("off") position where a lower end of the lever lies against formations on the housing 10. A C-spring 26 is constrained in compression between a shoulder on the support 12 and beneath a claw at an upper end of the lever 24. The upper end of the lever 24 is also provided with a nose extending towards the element 20 so that the tongue 22 of the element 20 engages the nose when it snaps to its hot position, causing the over-centre lever to trip from the ON position to the OFF position. The lower end of the lever 24 is provided with actuating surfaces 28 which bear on the ends of a pair of actuating rods 30, the end of one being visible in FIG. 2, which extend through respective bores provided in the rear of the housing 10. The function of the rods 30 is further described below.

The control 2 provides conducting electrical paths between the male connector portion 5 and contacts connected in use to the heating element head. Switches are provided in both the live and neutral side of the control 2. In the live side of the control a movable live contact spring strip 32 (see FIG. 5) which has a contact piece at its upper end forms a contact switch pair with fixed live strip 34 which likewise has a contact piece. The opposed contacts pieces may comprise discs of silver or other electrical contact alloy. The fixed strip 34 has an upstanding leg which terminates in a bent over region 36 at which the strip 34 is in use secured to the live cold tail of the heating element (not shown).

The movable live contact spring strip 32 has a lower rectangular aperture through which an insulative peg 35 extends and at which the contact spring strip 32 is supported as a cantilever. An enlarged actuating surface 38 is provided about two thirds of the distance up the contact spring strip from the peg 35.

An identical switch structure is also provided in the neutral side of the control by means a neutral fixed contact strip 42 having a bent over end portion 44 at which the contact strip is secured to the opposite neutral cold tail of the heating element extending through the element head (not shown). Movable neutral contact spring strip 40 is of similar construction to the live spring strip 32 and has an enlarged actuating surface 46, with opposed ends of the neutral contacts strips 42, 46 being provided with silvered contact pieces. The movable spring contact strip 40 is secured at its lower end to insulative peg 48 which extends through a rectangular opening therein.

The dry boil switching elements comprise, as described in detail in applicant's co-pending GB Application No. 0109777.3 a series of bimetallic disc elements held within cap 16 of known type which when cold are dished with concave surfaces facing to the switch rear, and which snap to an inverted configuration at predetermined temperatures. Such discs have a relatively small distance of movement (typically about 1 mm) but provide a large force (typically 500 gf). More particularly, there is provided the first bimetallic disc 18 selected to snap (switch) at about 140° C. and to re-set automatically when it has cooled to a lower temperature typically below about 70° C. to 100° C. A second bimetallic disc 52 is separated from the first disc by a metal heat-conductive spacer ring 54, this disc switching at a similar temperature to the first disc 18, and likewise being reversible on cooling. Third disc 56 interposed between first and second discs 18, 52 is selected to switch at a rather higher temperature, typically about 260° C. serving as a back-up switch, and being of a type which does not automatically snap back on cooling, thereby essentially disabling the kettle. The bimetal discs are operatively connected to the switch contact pairs through actuating means as now described. First bimetal disc 18 acts on a push rod 50, which extends through central openings in the second and third discs, and through an axial opening in a push rod sleeve 58 for the second and third discs. Both push rod 50 and sleeve 58 extend through an opening in the cover 14 to extend into the interior of the housing 10. As can be seen in FIG. 5, live and neutral dry boil switch levers 60, 62 are provided between the push rod 50 and sleeve 58 and the switch contacts. Both levers 60, 62 are pivotably mounted on shaft 64. The live switch lever 60 has at its lower end a flat surface against which an end of the push rod 50 engages and at its upper end a ring-like formation which bears against the rear side of the actuating surface 38 of the contact 32 and through which the actuator rod 30 of the trip lever 24 passes in an unobstructed manner so that this can likewise engage the rear of surface 38. Neutral lever 62 has at its lower end a ring-like formation dimensioned to allow push rod 50 to pass unobstructed therethrough to reach the end of the live lever 60, but obstructing the push sleeve 58. An upper end of the lever 62 engages beneath region 46 of the neutral contact, likewise having an upper ring formation through which an actuator rod 30 extends unobstructed to bear against the neutral movable contact spring strip 40.

In normal use of a kettle incorporating such a control 2, from an OFF position the user manually moves a button on the kettle exterior which is operatively connected to the lever 24 to cause it to snap over-centre to an ON position where the top of the lever lies adjacent the tongue 22 of the bimetal. On boiling, the bimetal 20 senses the steam and snaps to its hot position, the tongue 22 causing the lever 24 to snap over-centre to its OFF position in which the lower end of the lever urges actuating rods 30 to bear against surfaces 38, 46 and opening the contact pairs. It is arranged by appropriate construction and relative disposition of the various element described that the contact pairs be opened in a sequential manner, that is that the neutral contact pair opens momentarily before or after the live contact pair, thereby isolating the kettle element on both neutral and live sides in a sequential manner, reducing the changes in potential which are occurring at any instant of switching and thereby reducing the risk of arcing on the second contact pair.

In the event of a dry situation, in the absence of steam the steam-sensing bimetal 20 will not switch. In this case the temperature of the heating element will rise above its normal operating temperature. The first bimetal 18 of the dry boil switch elements which is closest to the element head will switch first, causing the central region of the bimetal to move rearwardly, pushing push rod 50 into the housing 10 and causing lever 60 to pivot, opening the live contact pair thereby switching off the power to the element at the live side. Very shortly thereafter bimetal 56 will switch, moving push-sleeve 58 to the rear, causing lever 62 to pivot opening the neutral contact pair.

On cooling, the bimetals 18, 56 revert to their cold position, the resilience of movable contact spring strips 32, 40 closing the contact pairs.

Figure 4:
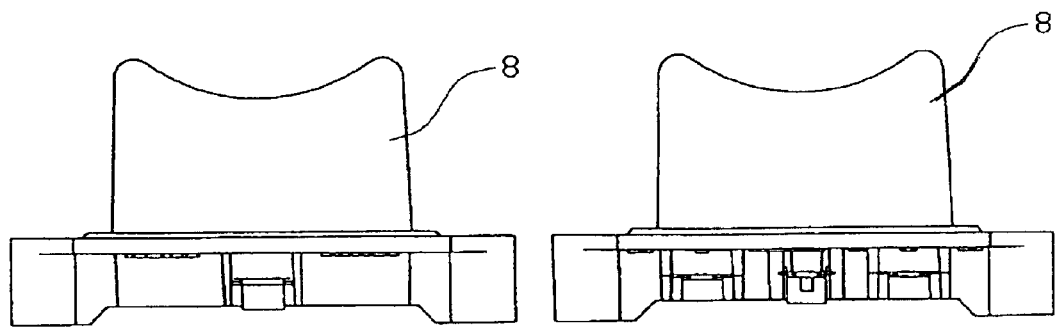
FIG. 4 is a front view of the control unit/connector, and the female connector.
Figure 9:
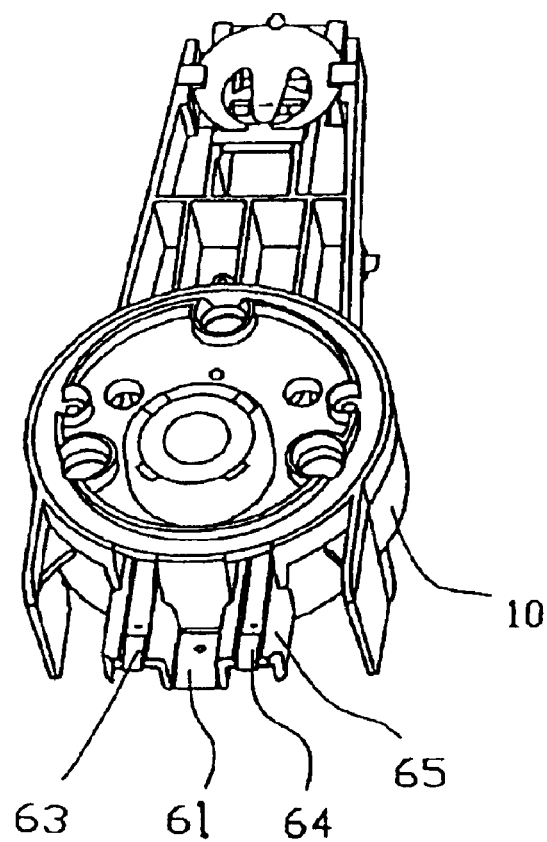
FIG. 9 is a perspective view from below of the control unit/connector.
Figure 8:
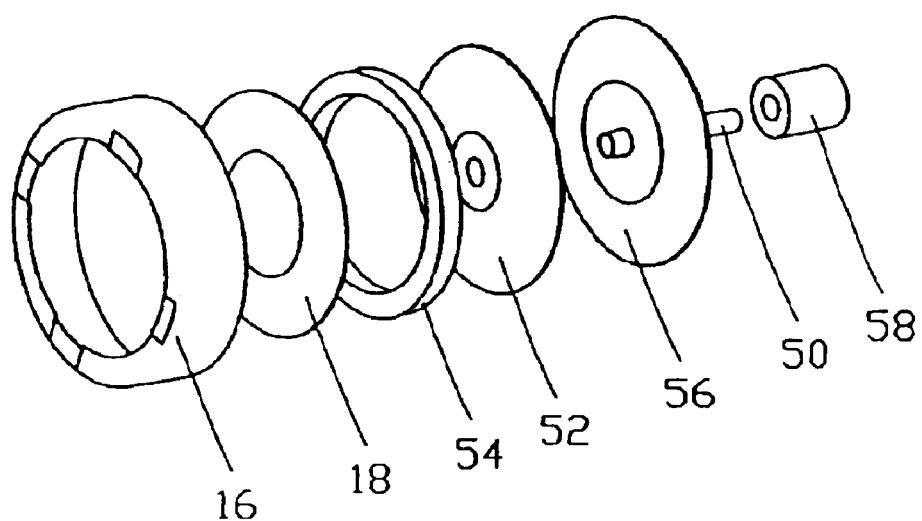
FIG. 8 is a perspective exploded view of part of a dry boil protector.

The structure of the connector is now described. As can be seen in FIGS. 3, 4 and 5, the lower region of the control unit supports the male contacts which comprise a central earth 61, and on opposite sides the live and neutral contacts 63, 67 each of which extend directly vertically downwardly from the control unit. Each comprise thin conductive members in the form of conductive strips secured to or bent over a thin tongue 65 of insulating material which constitutes a lower extension of the control unit housing 10. The earth strip 61, as best seen in FIG. 3 comprises a strip which curves from a securing point 66 where in use it is clamped to the head part of the heating element having a straight portion wrapped over the end of the central region of tongue 65 and back on itself being to secured to itself through aligned openings through the earth strip 61 and tongue 56 by riveting or other suitable means. The live and neutral conductive strips 63, 67 extend from the interior of the control unit, as best seen in FIG. 5, being secured to the movable contact strips 32 and 40 respectively at the insulative pegs 35, 48 which are hot staked to hold the parts in conductive contact. The strips 63, 67 extend through openings in the lower region of the housing, being bent about the leading (lower) end of the tongue 65 and each secured back on itself by riveting or other suitable means. As best seen in FIG. 9 the tongue has a non-linear bent configuration with the plane of the earth contact spaced rearwardly with respect to the plane of the live and neutral contacts. More particularly, the tongue essentially is shaped as a pair of rearwardly facing channel sections (on which the live and neutral contacts are held)

with a forwardly facing channel section therebetween (on which the earth contact is held). This construction ensures that a tongue of very rigid form and yet of minimal thickness can be provided. It will be appreciated that other shapes of tongue could be employed providing a rigid non-linear (in cross-section) structure of small thickness is achieved.

The structure whereby the movable live and neutral switch contacts 32, 40 are joined to separate live and neutral contacts 63, 67 of the connection portion means that the high quality conductive spring alloy demanded by the switch contacts can be confined thereto, and the contacts 63, 67 made of inexpensive metal such as copper, or copper alloy such as bronze. However, the spring contacts 32, 40 could readily be unitarily formed with the contacts 63, 67 for ease of manufacture.

Turning now to the female connector 8 as best seen in FIGS. 10(*a*) and 12, this has an upstanding shaped housing 70 of moulded plastics material secured at its lower periphery to a generally planar support which is provided with moulded openings 74 for receiving screws for fixing the female connector to the main body of the appliance base 6. An upper end of the housing 70 defines a continuous but non-straight slot 76 which has a shape corresponding to the cross-sectional shape of the tongue 65 and which receives the tongue 65 of the male connector. As best seen in FIG. 10(*b*) there are provided a pair of L-shaped electrical contacts 78, 80 being the neutral and live contacts respectively having spade terminals at their lower ends and at their upper ends extending upwardly within the housing towards the slot 76. The contacts 78, 80 including regions 82, 84 at which they are bent slightly downwardly near the bottom of their upstanding portions to give these enhanced springiness or flexibility. The upper ends of the contacts terminate in contact portions 86, 88 of highly conductive metal such as silver contacts, as is well-known in the art in order to ensure a good electrical connection. The silver contacts remain a minimum distance below the slot as required by safety standards. A central earth contact 90 has a slightly different structure, and instead of having a silvered contact region having a wrapped over end region 92. The non-linear slot 76 ensures that thin flat objects cannot be inserted into the slot in a manner which could make electrical contact with more than one of the contacts 78, 80, 90 at any one time.

On mating of the connectors 5, 8 the end radii of the connector strips 63, 67 and 61 where these are wrapped over the lower leading end of the tongue 65 engage the contact pieces 88, 86 and the earth contact 90 respectively. It is deliberately arranged that there is at least a small vertical distance of travel of the contacts whilst engaged and that there is at least a small amount of laterally relative through slight sliding or rolling movement therebetween which serves to clean the male contact strips each time they mate with the live contact of the female connector.

As can be seen in FIG. 5 the earth contact 90 extends upwardly beyond the live and neutral contacts 80, 78 so that on mating of the connectors the electrical connection of the earth is made first, and on disengagement, broken last.

FIG. 6 illustrates an alternative embodiment identical in all respects except that a neutral strip 67' and supporting region of the tongue 65 of the male connector 5 is disposed slightly higher than the live strip 62 set back from the leading end of the tongue 65, whereby the live connection is made before the neutral connection on mating, and broken later on disengagement. This ensures a sequential electrical connection of live and neutral supply, minimising incidences of arcing which can lead to deterioration of the contacts, and at worst in case of high-inductance heating elements, severe arcing to earthed metal.

FIG. 7 illustrates a further alternative embodiment identical in all respects with the exception of the neutral contact 78' in the female connector which extends higher than the live contact, to ensure the neutral electrical connection is made first and broken last, and that the electrical connections are sequentially made.

It will be appreciated that other adaptations with respect to relative positioning of contact strips 63, 67 and contacts 80, 78 could be made to ensure this sequential electrical connection.

The described structure employing a combined control and connector, in departing from the conventional structures dictated by the arrangement of three plug pin required by I.E.C. standards, allows a control and connector of particularly compact and robust construction.

What is claimed is:

1. A combined control unit/connector for a cordless electrical water heating appliance for connection in use to a heating element thereof and for providing releasable connection to a separate base, comprising a housing, thermally sensitive control means for switching of said heating element and a tongue-like protrusion extending vertically from directly beneath said housing and having a width greater than its thickness with contacts disposed spaced across the width of the protrusion.

2. A combined control unit/connector according to claim 1 wherein the protrusion is unitarily formed with the housing.

3. A combined control unit/connector according to claim 1 wherein the protrusion has a non-linear-shaped section.

4. A combined control unit/connector according to claim 1, wherein the protrusion has a cross section shape so that adjacent contacts are displaced relatively to each other in the direction of the thickness of the protrusion in a staggered arrangement.

5. A combined control unit/connector according to claim 1 wherein the protrusion has a shape defining a pair of channels facing in one direction with a channel therebetween facing in the opposite direction, the contacts being disposed at the base of each channel.

6. A combined control unit/connector according to claim 1 wherein the contacts comprise thin metal ships.

7. A combined control unit/connector according to claim 6 wherein the protrusion has opposite faces with the thin metal strips each extending from the control unit down one face, over a lower free end of the protrusion and back up an opposite face of the protrusion.

8. A combined control unit/connector according to claim 6 wherein the thin metal ships are of less than 0.5 mm thick.

9. A combined control unit/connector according to claim 6 wherein the thin metal strips are formed of copper or an alloy thereof.

10. A combined control unit/connector according to claim 1 wherein the contacts are unitarily formed with or directly connected to switching spring contacts within the control unit.

11. A combined control unit/connector according to claim 1 wherein the contacts comprise live, neutral and earth contacts and wherein one of the live and neutral contacts is arranged to extend in a direction further from the control unit than the other.

12. A combined control unit/connector according to claim 1 wherein the housing is provided with water-shielding walls which depend from the housing spaced from the protrusion.

13. A combined control unit/connector according to claim 1 wherein the thermally sensitive control means include a steam sensing trip lever to switch off the appliance on boiling of water.

14. A combined control unit/connector according to claim 1 wherein the thermally sensitive control means include sensing means adapted to switch off the appliance at an elevated temperature corresponding to a dry boil condition.

15. A combined control unit/connector according to claim 1 in combination with a female connector for fitting to a power-supplying base, the female connector having an opening for receiving the protrusion and electrical contacts which engage the electrical contacts of the control unit/connector on mating of the connectors.

16. A combined control unit/connector according to claim 1 in combination with a female connector for use in a power-supplying base of a cordless water-heating appliance comprising a housing defining a single continuous slot at an upper region thereof through which a male connector can be inserted and electrical contacts disposed beneath the slot.

17. A cordless electrical kettle with combined control unit/connector as defined in claim 1 in combination with a power-supplying base having a female connector for use in a power-supplying base of a cordless water-heating appliance comprising a housing defining a single continuous slot at an upper region thereof through which a male connector can be inserted and electrical contacts disposed beneath the slot.

18. A female connector part for use in a power-supplying base of a cordless water-heating appliance comprising a housing defining a single continuous elongate slot at an upper region thereof through which a male connector part can be inserted and electrical contacts disposed beneath the slot, wherein the slot has a non-linear shape.

19. A female connector according to claim 18 wherein the slut has a shape comprising straight portions each extending in the general direction of the extent of the slot where adjacent straight portions are laterally displaced with respect to each other in a staggered arrangement.

20. A female connector according to claim 19 wherein the electrical contacts are disposed beneath said straight portions.

21. A female connector according to claim 19 wherein the slot has a pair of substantially co-liner portions disposed above live and neutral contacts with the laterally displaced portion arranged therebetween above an earth contact.

22. A female connector according to claim 18 wherein live and neutral contacts are disposed in the housing beneath the slot with one of the live or neutral contacts disposed closer to the slot than the other.

23. A power-supplying base having a female connector according to claim 18.

24. A combined control unit/connector for a cordless electrical water heating appliance for connection in use to a heating element thereof, comprising a housing, thermally sensitive control means for switching of said heating element and a protrusion extending vertically from directly beneath said housing in which are disposed electrical contacts for making connection to a separate base, wherein the protrusion has a shape defining a pair of channels facing in one direction with a channel therebetween facing in the opposite direction, the contacts being disposed at the base of each channel.

25. A combined control unit/connector according to claim 24 wherein the contacts comprise thin metal strips, the protrusion having opposite faces with the thin metal strips extending from the control unit down one face over a lower free end of the protrusion and back up an opposite face of the protrusion.

26. A female connector part for use in a power-supplying base of a cordless water-heating appliance comprising a housing defining a single continuous elongate slot at an upper region thereof through which a male connector part can be inserted and electrical contacts disposed beneath the slot, wherein the slot has a shape comprising straight portions each extending in the general direction of the extent of the slot where adjacent straight portions are laterally displaced with respect to each other in a staggered arrangement.

27. A female connector part for use in a power-supplying base of a cordless water-heating appliance comprising a housing defining a single continuous elongate slot at an upper region thereof through which a male connector part can be inserted and electrical contacts disposed beneath the slot, wherein the slot has substantially aligned opposite end regions overlying respective electrical contacts, with a central region therebetween having an electrical contact laterally displaced relative to the aforesaid contacts.

28. A female connector part according to claim 27 wherein the electrical contacts beneath the aligned opposite end regions of the slot are live and neutral contacts and the laterally displaced electrical contact is an earth contact.

29. A female connector part for use in a power-supplying base of a cordless water-heating appliance comprising a housing defining a single continuous elongate slot at an upper region thereof through which a male connector part can be inserted and electrical contacts disposed beneath the slot, wherein live and neutral contacts are disposed in the housing beneath the slot with one of the live or neutral contacts disposed closer to the slot than the other.

* * * * *